United States Patent [19]
Goldfein

[11] Patent Number: 4,725,491
[45] Date of Patent: Feb. 16, 1988

[54] REINFORCED CEMENT PRODUCTS WITH IMPROVED MECHANICAL PROPERTIES AND CREEP RESISTANCE

[76] Inventor: Solomon Goldfein, 8370 Greensboro Dr., Apt. 403, McLean, Va. 22102

[21] Appl. No.: 883,730

[22] Filed: Jul. 9, 1986

[51] Int. Cl.⁴ .......................... B32B 3/26; B32B 15/18
[52] U.S. Cl. .................................. 428/312.4; 106/99; 106/100; 427/419.2; 428/469; 428/703
[58] Field of Search ................ 106/99, 282, 100; 428/2, 457, 703, 469, 312.4; 264/71; 427/419.2

[56] References Cited
U.S. PATENT DOCUMENTS

| | | | |
|---|---|---|---|
| 3,650,785 | 3/1972 | Ball et al. | 106/282 |
| 3,991,005 | 11/1976 | Wallace | 428/2 X |
| 4,062,913 | 12/1977 | Miller et al. | 264/71 X |

Primary Examiner—Thomas J. Herbert
Attorney, Agent, or Firm—Terrell P. Lewis

[57] ABSTRACT

Steel reinforcing elements having layers of chemical conversion iron oxide coatings on the exterior surface thereof such as black iron oxide employed in admixture with castable cement products improve creep resistance and exhibit improved mechanical properties.

22 Claims, 8 Drawing Figures

LAYERS ON OXIDIZED STEEL SPECIMEN

CREEP TEST SPECIMEN AND ASSEMBLY

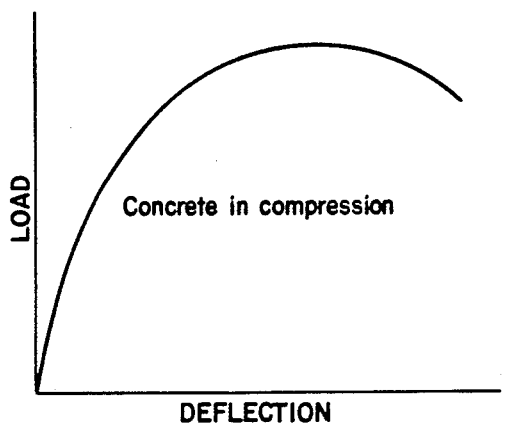

Fig. 3a Concrete in compression

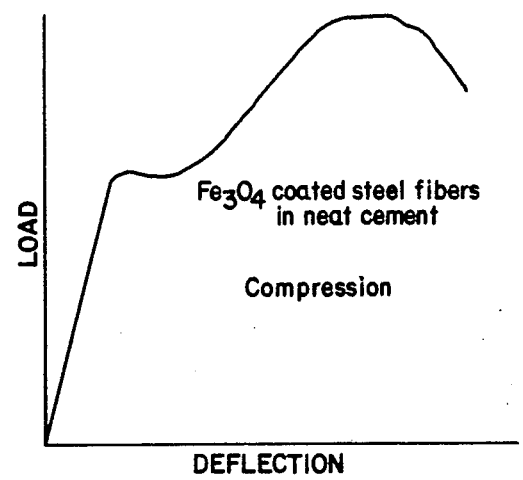

Fig. 3d $Fe_3O_4$ coated steel fibers in neat cement — Compression

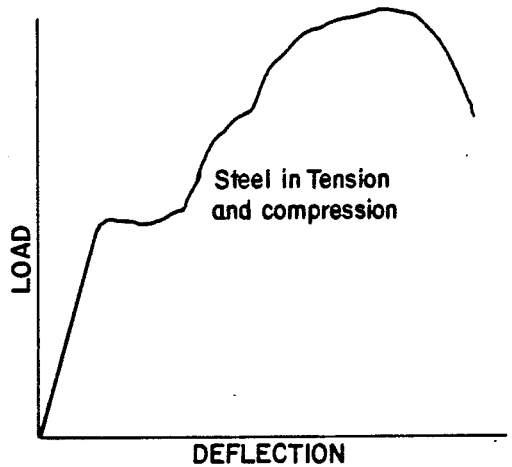

Fig. 3b Steel in Tension and compression

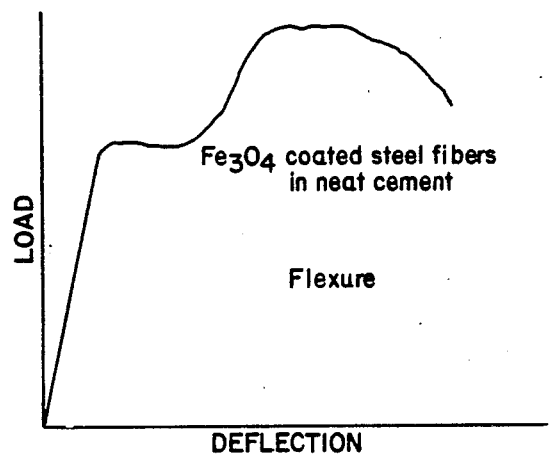

Fig. 3e $Fe_3O_4$ coated steel fibers in neat cement — Flexure

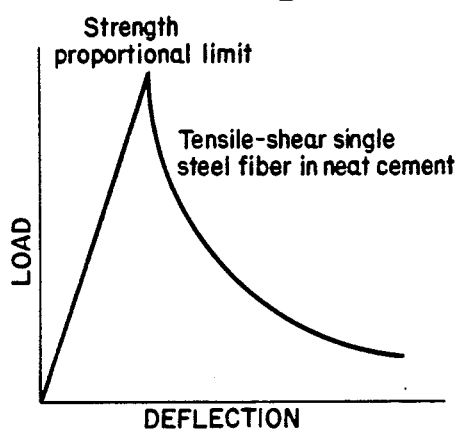

Fig. 3c Strength proportional limit — Tensile-shear single steel fiber in neat cement

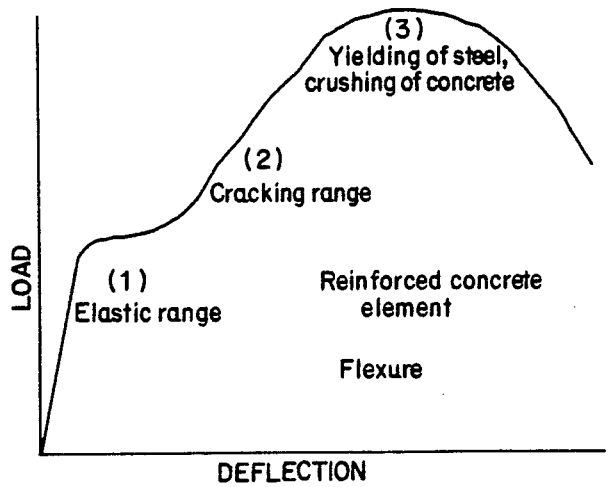

Fig. 3f (1) Elastic range, (2) Cracking range, (3) Yielding of steel, crushing of concrete — Reinforced concrete element Flexure

REINFORCED CEMENT PRODUCTS WITH IMPROVED MECHANICAL PROPERTIES AND CREEP RESISTANCE

BACKGROUND OF THE INVENTION

1. Field of the Invention

The present invention relates to fiber reinforced, castable matrices, and more particularly to castable matrices, such as cement products, reinforced with chemically treated steel fibers to form an admixture having improved creep resistance, and exhibiting improved mechanical properties.

2. Description of the Prior Art

The use of short length steel fibers randomly dispersed in concrete products has been found to improve the compressive-impact, flexural and crack propagation properties in the reinforced product. Numerous applications for fiber-reinforced cement products are known, but they are principally for controlling crack propagation, and not for continuous load-bearing structural purposes.

Many efforts have been made to adapt fibers for use in structural applications of this type, but all attempts involve alteration of the shape of the fibers. One example of this is the deformation of the fibers for the purpose of increasing their tensile-shear bond to concrete and other cement products. Although the pull-out resistance of such deformed fibers increases, nonetheless, it has been found that the fibers pull out while under constant load. Thus, no evidence has yet been found to support a conclusion that fiber reinforcement has a significant effect on the creep behavior of portland cement mortar (see State-of-the-Art Report on Fiber Reinforced Concrete, Report No. ACI 544.1R-82). Unlike conventional reinforced concrete, maximum load is controlled primarily by fibers gradually pulling out, and the stress in the fiber at the ultimate load is substantially less than the yield stress of the fiber itself.

In present state-of-the-art reinforced concrete technology, the bond between steel fibers and concrete is considered to be derived from two sources.

First, when steel reinforcing elements such as fibers, wires or rebars are used, it has been determined that a frictional bond exists between the concrete and the steel elements which increases as the concrete ages, and which is due to the shrinkage of the concrete around the steel elements.

Second, when steel reinforcing elements such as bars having deformations (i.e., lugs or protrusions) are used, it has been found that longitudinal movement of the steel bars in the concrete is inhibited.

In no case has evidence been found of a chemical bond between the steel reinforcing elements and the concrete. In fact, no traces of hardened cement paste have been found on the surfaces of the conventionally used steel reinforcing elements after debonding.

In "Limit State Design of Structural Concrete" by Regan and Yu, an approximate relationship for shear stress and relevant factors is described, and the following formula is provided:

$$\text{shear stress} = (K_1) \cdot (K_2) \cdot (f_{cr})$$

where $K_1$ is a coefficient depending on the bar surface, $K_2$ is a coefficient depending on the position of the bar and $f_{cr}$ is the 28 day compressive strength.

$K_1$ ranges from 0.04–0.16 depending on whether the surface is heavily pitted, moderately pitted or is rolled. $K_2$ is 1.0 for vertical bars and 0.33–0.5 for horizontal bars. Chemical bond is not present as a relevant factor.

Consideration has been given to precoating steel fibers with plastic materials to increase the interfacial shear strength between the fibers and concrete (see U.S. Pat. No. 3,650,785 to Ball et al.). The materials proposed were liquid type organic coatings such as epoxy resin adhesives, organic phosphate resin and other organic resin mixtures.

However, the system of Ball et al. has exhibited several serious limitations. Most notable is the effect of interposing one of above-identified materials, which typically has a Young's modulus of elasticity (E) of about 350,000 psi, between the steel (E = 30,000,000 psi) and the concrete (2,500,000 psi). In such situations, the steel has effectively been prevented from reinforcing the concrete. Moreover, interfacial shear stress applied to such a system tends to cause a large strain in the coating and to thereby cause failure in the concrete due to lack of transfer of support from the steel.

Clearly there is a need for a bonding agent with a modulus of elasticity (E) close to that of steel. Moreover, whereas liquid adhesives such as those disclosed by Ball et al. bond well to hardened concrete, concrete paste does not bond to cured or hardened plastics.

OBJECTS OF THE PRESENT INVENTION

It is therefore a principal object of the present invention to provide a steel reinforcing system for reinforcing a castable matrix of concrete with selected aggregate which will overcome all the deficiencies and disadvantages of the prior art systems.

Another object of the present invention is to provide a chemical conversion coating on steel reinforcing elements to facilitate a chemical bond between the fibers and a castable matrix of cement and selected aggregate.

Still another object of the present invention is to provide an admixture of cement and selected aggregate containing steel fibers having a chemical conversion coating on surfaces of the fibers so that a chemical bond is obtained between the cement product and the steel fibers.

Yet another object of the invention is to provide a concrete and selected aggregate admixture with steel fibers in which there is improved tensile-shear resistance to pull-out of the steel fibers, and improved compressive, flexural and compressive-impact strengths.

An additional object of the present invention is to provide a cement and selected aggregate admixture containing bars, wires or fibers chemically bonded to the cement product whereby greater reinforcing capacity is achieved.

Yet another object of the present invention is to provide a steel reinforced cement and selected aggregate matrix including a bonding agent with a modulus of elasticity (E) close to that of steel.

BRIEF DESCRIPTION OF THE DRAWINGS

The above and other objects, features and advantages of the present invention will be better understood from reading the following description of the preferred embodiments taken in conjunction with the accompanying drawings in which:

FIGS. 3a,b,c,d,e, and f illustrate various load deflection curves.

DESCRIPTION OF THE PREFERRED EMBODIMENTS OF THE PRESENT INVENTION

Figure 1:
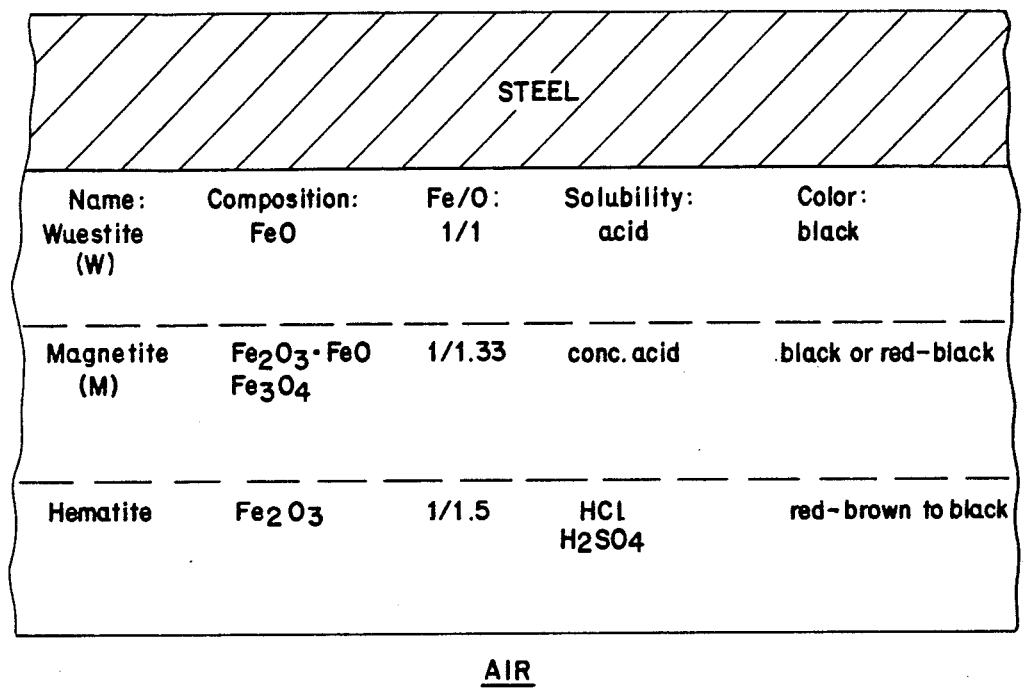
FIG. 1 is a representation of the layers on an oxidized steel specimen.

The present invention is concerned with the discovery that a castable matrix of cement will react chemically with, and bond to, chemical conversion coatings on steel as the cement sets. The coatings are ferrous oxide (FeO), and a mixed oxide structure having the composition $Fe_2O_3.FeO$ often written as $Fe_3O_4$ and called iron ferrosoferric and black iron oxide. The Young's moduli of these coatings are close to that of steel. The latter coating is used as a decorative, and corrosion-resistant, coating for steel.

Black iron oxide is not to be confused with rust which is a hydrated oxide of iron, mainly $2Fe_2O_3.3H_2O$ also described as $Fe_2O_3.xH_2O$. Rust is formed on steel by exposure to moisture and air, is of orange to red to brown in color, and is detrimental to the bond of cement to steel. In contrast, and commensurate with experiments made in connection with the discovery of the present invention, black iron oxide actually promotes the bond of cement to steel. This was an unexpected finding in view of the fact that rust and black iron oxide are so similar in composition.

Processes for forming iron oxide coatings of the chemical conversion type are not new and have been known for many years. There are a number of methods by which the coatings may be formed. One known method is by pot annealing or black annealing and is performed by heating the steel in furnaces to anneal it and then slowly cooling the annealed steel. Another known method is by interaction with superheated steam. Other methods include chemical oxidizing such as alkaline oxidizing and fused salt oxidizing.

Most chemical oxidizing processes do not form pure FeO or $Fe_3O_4$. Actually three compositions are formed (see FIG. 1):

(1) an outer layer of $Fe_2O_3$;
(2) an intermediate layer of $Fe_3O_4$; and
(3) an inner layer of FeO.

The outer layer ($Fe_2O_3$) has the form of a smut which may be removed by a variety of means, e.g. by a combination of spray rinses or by a double counterflow rinse operation. If not removed, the outer layer composition could reduce the tensile-shear strength by as much as 50%.

The intermediate layer ($Fe_3O_4$) may be used for bonding, but in this case, the removal of all the $Fe_2O_3$ is necessary.

Alternatively, if the ferrous oxide (FeO) surface is to be used for bonding, then the $Fe_3O_4$ must also be removed. This may be accomplished by differential solvation with acid or possibly some other material or by mechanical abrasion. The latter method is safer if the objective is to avoid removing the FeO layer inadvertently.

Although both $Fe_3O_4$ and FeO are black in color, the coatings can be distinguished from each other by the gray color which the FeO layer displays. This coating is very thin with the result that the silvery color of the steel base combines with the black color of the FeO over it to yield a gray appearance.

The preferred bonding coat is FeO. It has a lower oxidation state than $Fe_3O_4$ and therefore has more functional groups available for bonding. Bonds made with FeO coatings have averaged about 10% higher in strength than those made with $Fe_3O_4$ coatings.

Regardless of the material used, strong adherent coatings are formed. Cement forms a strong chemical bond with these conversion coatings to yield reinforced composites displaying no discernable creep and a strength greater than similar composites in which the steel has no coating. Regardless of the form of the reinforcing element, i.e., fibers, wire or bars, with or without deformations, and whether long or short, the use of the chemical conversion coating will improve the bond of the cement to the steel reinforcement and reduce creep to an unmeasurable amount.

As an example, Table 1 illustrates a comparison of some mechanical properties of neat cement reinforced with $Fe_3O_4$ coated, and uncoated, steel fibers one inch long. For all characteristics except compressive strength, notable improvements in strength were obtained in spite of the use of less than 1% fibers by volume. Some segregation of fibers occurred because of the relatively high density of the fiber combined with the low viscosity of the cement paste. Fibers therefore had a tendency to lay in a horizontal plane. This caused lower compressive, and higher flexural, properties.

Examination of exposed steel in the specimens which were tested displayed cement particles which had sheared from the matrix cement and were firmly bonded to the $Fe_3O_4$ coated steel fibers. In contrast, the uncoated fibers were clean and bare.

Referring now to FIG. 1, various examples of load-deflection curves are shown for comparative and illustrative purposes.

In example (a), the compression curve for concrete exhibits a parabolic shape indicating that the concrete is plastic in nature.

In example (b), a curve for steel is shown as having an initial straight line portion which represents an elastic range of the material.

Example (c) represents the tensile-shear curve for a single $Fe_3O_4$ coated fiber in neat cement, and is shown to have an elastic portion similar to that of steel.

In example (d) and example (e), representing compression and flexure, respectively, the curves are similar to the curve of example (f), which is a typical flexure curve for a reinforced concrete element. The elastic or straight line portion of the curve can be used for design purposes for true structural or load bearing uses in continual use. No cracking occurs if the loading is maintained within this range. Beyond the elastic range (1) is a cracking range (2) and yielding of steel and crushing of concrete (3). Curves (e) and (f), both drawn during a flexural test, have the same configuration thereby showing that the $Fe_3O_4$ coated steel fibers in neat cement and the reinforced concrete element both have similar properties.

Figure 2:
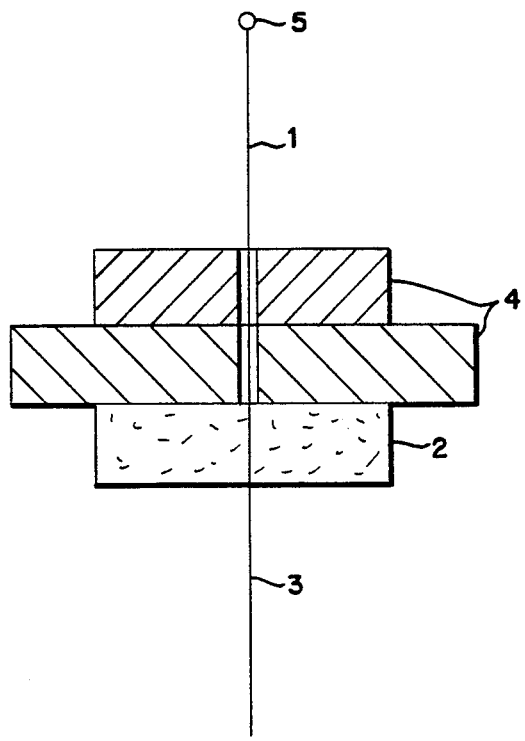
FIG. 2 illustrates the test apparatus by which the strength of specimens of the cement and steel reinforcing system was tested.

FIG. 2 shows an assembly with which creep was measured in neat cement using essentially a tensile-shear test, principally because of its simplicity and the smaller standard deviations experienced with this type of test compared to other tests concerned with other properties. In performing this test, a wire 1 was embedded in a castable mix and allowed to set for a specified period of time to yield form 2. Changes in the length of the wire protruding from form 2 were measured at 3; this measured change of length represented the creep experienced. Steel weights with holes drilled in their centers 4 were positioned atop form 2 with the wire 1 extending through the weights. The entire assembly was then hung from support 5. By virtue of this arrangement, pressure was thus applied so that shear forces were exerted on the bond between the cement and the coated fiber. ASTM specification C 512-82, "Creep of Concrete in Compression" provided information with regard to test periods and loading. When the specimens were 28 days old, they were loaded with loads no greater than 40% of the compressive 28 days strength. In this work, test specimens were loaded at both 7 and 28 day periods. The stress levels were 76%, 55%, 30%, 23% and 11.5% of the proportional limit strength. After 7500 hours under load no measurable creep was recorded. Test specimens included both 1010 black ($Fe_3O_4$) annealed steel (0.032") dia. and ASTM A-227 Class I steel (0.0232") dia. black ($Fe_3O_4$) finished to MIL-C 13924 Class I.

For the purposes of this disclosure, the bonding matrix is an inorganic hydraulic composition capable of setting and hardening under water due to interaction of the water and constituents of the cement. The term "matrix" refers broadly to moldable materials. Materials which come under this category are portland cement, ASTM C-150, gypsum, ASTM C-22, masonry cement, C-98, slag cement and the like. Mortar is composed of cement, fine aggregate and water; neat cement is cement and water; concrete is mortar and coarse aggregate. The term "black iron oxide" refers to either $Fe_3O_4$ ($FeO.Fe_2O_3$) or FeO, or a laminate of both, the $Fe_3O_4$ being on the exterior.

The present invention contemplates the use of steel reinforcing elements regardless of size, diameter or shape (i.e., bars, wire, or fibers). For example, deformed bars which are contemplated are commercially available in diameters from ⅜ths inch to approximately 2¼ inches. Wire which is contemplated is available in diameters of from approximately ⅛ inch to approximately ⅜ths inch. Although there are no diameter specifications for steel fibers, steel with diameters less than ⅛th inch for the purposes of this disclosure are considered to be fibers. Fibers, like bars, may be used with deformations. These deformations can be of any cross-sectional shape, such as for example, round, flat, oval, or alternatively may take the form of crimped ends, spirals, corrugations, lugged ends, etc. The reinforcing elements of the present invention may have any shape, form or length provided they are coated with black iron oxide or ferrous oxide coatings on the exterior of the elements as described above.

A typical recipe for a general purpose concrete using steel fiber reinforcing elements is:

| | |
|---|---|
| Portland cement | 249 lbs. |
| slag cement | 249 lbs. |
| sand | 1313 lbs. |
| gravel | 1800 lbs. |
| water | 264 lbs. |
| water reducer | <1 lb. (14.9 oz.) |
| steel fiber reinforcing elements coated with black iron oxide | 194 lbs. |

The resulting mixture has a total weight of 4070 lbs., and occupies approximately one cubic yard. The water-to-cement ratio w/c=0.53 and the mixture contains 4.8% reinforcing elements by weight, and a little over 1% by volume. The length of the reinforcing elements is preferably ½ inch to 6 inches.

While it is known in the art that the addition of reinforcing elements, of from 50 lbs. to 200 lbs. per cubic yard, can provide significant improvement in many engineering properties, nevertheless, there is virtually no minimum or maximum quantity of reinforcing elements which can be added which will not enhance one or more of the properties of concrete when the elements are coated with $Fe_3O_4$ or FeO. Hence, it is preferable that no limit be placed on the quantities of elements which may be added. For example, a design may call for extra strength at a strategic location, thereby necessitating the addition of a number of pounds of fiber reinforcing elements. Likewise, when bars are used as in conventional reinforced concrete, the number of bars used is dictated by the desired design and strength requirements of the final mixture or product. Furthermore, the addition of an $Fe_3O_4$ coating on the reinforcing element, whether fiber, wire or bar, and regardless of the presence of deformations, will upgrade the strength of the resulting mixture or product, as shown in Table 1.

There are numerous methods which can be used to add the fibers to the cementitious mixture. These include addition at the pouring site to the rotating drum of the conventional concrete delivery truck; addition of the fibers to a dry cement powder, mortar mix or concrete mix and then adding water; incorporation into a mix to be gunned on to a surface, etc. The invention is amenable to any process presently being used in which uncoated fibers are incorporated into a cement mix. It is apparent from the above that various changes and modifications may be made without departing from the invention. Accordingly, the scope thereof should be limited only by the appended claims.

TABLE 1

Comparison of Neat Cement Reinforced with Bars and Coated Fibers

| | Spring Steel Fiber(a) | | | Commercial Fiber with Deformations(h) | | |
|---|---|---|---|---|---|---|
| | Bare | Coated (c) | Change % | Bare | Coated (c) | Change % |
| Tensile-shear strength, proportional limit 28 days, psi(b) | 601 | 751 | +20 | 1031 | 1248 | +21 |
| Flexural str. 28 days, ult., psi(d) | 1690 | 2081 | +23 | | | |
| Compressive strength, 28 days ult., psi(e) | 3550 | 3660 | +3(f) | | | |
| Compressive-impact strength 28 days, blows to failure(g) | 21 | 26 | +19 | | | |

(a)ASTM A-227 Class 1, 0.0232" dia.
(b)Specimen, a single fiber embedded in appx. ⅜" neat cement. ASTM C-150 Type 1 cement, w/c 0.45 was used in all specimens for property tests.
(c)Coated in accordance with Military Specification MIL-C 13924 C Class 1.
(d)Specimen 6" by 1¼", span 4", 3 point loading, cross-head speed 0.02"/min.
(e)Specimen 2" dia. 2" in height, test speed 0.02"/min.
(f)Value considered to be barely significant.
(g)8 lb wt., drop 12" on top of cone 2" high, top dia. 1¼", bottom dia. 2".
(h)Commercial fiber 0.02" dia., 1.2" long with 2 deformations at each end. Test specimen had one deformation embedded 0.6" in neat cement. All other test specimens which were bare were 1" in length, except those with deformations which were 1.2" long.

What is claimed is:

1. A creep resistant reinforced cement product containing an admixture of inorganic hydraulic cement and selected aggregate, and steel reinforcing elements having on exterior surfaces a layer of black iron oxide.

2. The creep resistant reinforced cement product of claim 1, wherein said fibers are substantially ½ inch to 6 inches in length.

3. The creep resistant reinforced cement product of claim 1, wherein said reinforcing elements are substantially uniformly distributed throughout said admixture.

4. The creep resistant reinforced cement product of claim 3, wherein said reinforcing elements comprise finite fibers.

5. The creep resistant reinforced cement product of claim 1, wherein said reinforcing elements comprise bars.

6. The creep resistant reinforced cement product of claim 3, wherein said reinforcing elements comprise bars.

7. The creep resistant reinforced cement product of claim 6, wherein said fibers are substantially ½ inch to 6 inches in length.

8. The creep resistant reinforced cement product of claim 1, wherein said reinforcing elements comprise finite fibers.

9. The creep resistant reinforced cement product of claim 8, wherein the percentage of said fibers in a unit volume of said product is in the range of about 0.3% to 10%.

10. The creep resistant reinforced cement product of claim 1, wherein said reinforcing elements comprise wires.

11. The creep resistant reinforced cement product of claim 10, wherein said wires are substantially 3 inches to 100 yards in length.

12. For use in reinforcing cement products, steel reinforcing elements having a chemical conversion coating on exterior surfaces consisting essentially of FeO.

13. Steel reinforcing elements for improving mechanical properties of cement products, comprising:
   layers of chemical conversion iron oxide coatings on the exterior surface of said elements, said layers consisting essentially of $FeO.Fe_2O_3$, and FeO, respectively.

14. For use in improving structural properties of a cement product, a steel reinforcing element having a black iron oxide chemical conversion coating on exterior surfaces, said coating comprising a layer which is bondable with the cement product and which has a modulus of elasticity substantially the same as the modulus of elasticity of steel.

15. For use in improving structural properties of a cement product, a steel reinforcing element having a chemical conversion coating on exterior surfaces, said coating comprising a layer which consists essentially of FeO, is bondable with the cement product, and has a modulus of elasticity substantially the same as the modulus of elasticity of steel.

16. For use in reinforcing cement products, steel reinforcing elements having a chemical conversion coating on exterior surfaces consisting essentially of $FeO.Fe_2O_3$.

17. A castable matrix, comprising:
   an admixture of concrete, and
   steel reinforcing elements having an exterior chemical conversion coating of FeO.

18. A castable matrix, comprising an admixture of concrete and steel reinforcing elements, said elements having a chemical conversion coating of black iron oxide which has a modulus of elasticity substantially the same as the modulus of elasticity of said steel reinforcing elements.

19. A castable matrix, comprising an admixture of concrete and steel reinforcing elements, said elements having a chemical conversion coating of FeO which has a modulus of elasticity substantially the same as the modulus of elasticity of said steel reinforcing elements.

20. A castable matrix comprising an admixture of concrete, and steel reinforcing elements having an exterior chemical conversion coating of $FeO.Fe_2O_3$.

21. A method of reinforcing a mixture of cement, selected aggregate and water to form a product having improved mechanical properties, comprising the steps of:
   providing steel reinforcing elements having on exterior surfaces an iron oxide chemical conversion coating selected from the group consisting essentially of FeO and $FeO.Fe_2O_3$; and
   dispersing said reinforcing elements in said mixture of cement, selected aggregate and water.

22. A method of preparing steel reinforcing elements to be added to a cement, water and selected aggregate mixture to obtain an admixture with improved mechanical properties and an increased resistance to creep when the admixture sets, comprising:
   treating the steel of the reinforcing elements to form, on the exterior surfaces of said reinforcing elements, a chemical conversion coating of an iron oxide selected from the group consisting essentially of FeO and $FeO.Fe_2O_3$.

* * * * *